US011999592B2

(12) United States Patent
Bütler et al.

(10) Patent No.: US 11,999,592 B2
(45) Date of Patent: Jun. 4, 2024

(54) ELEVATOR SYSTEM HAVING A DERAILMENT PROTECTION DEVICE

(71) Applicant: Inventio AG, Hergiswil (CH)

(72) Inventors: Erich Bütler, Ebikon (CH); Romeo Lo Jacono, Gravesano (CH); Paolo Ferrario, Thalwil (CH); Peter Möri, Rothenburg (CH)

(73) Assignee: INVENTIO AG, Hergiswil (CH)

( * ) Notice: Subject to any disclaimer, the term of this patent is extended or adjusted under 35 U.S.C. 154(b) by 103 days.

(21) Appl. No.: 17/309,483

(22) PCT Filed: Dec. 17, 2019

(86) PCT No.: PCT/EP2019/085725
§ 371 (c)(1),
(2) Date: Jun. 1, 2021

(87) PCT Pub. No.: WO2020/127322
PCT Pub. Date: Jun. 25, 2020

(65) Prior Publication Data

US 2022/0041406 A1 Feb. 10, 2022

(30) Foreign Application Priority Data

Dec. 20, 2018 (EP) .................................... 18214771
Jun. 28, 2019 (EP) .................................... 19183314

(51) Int. Cl.
*B66B 7/02* (2006.01)
*B66B 5/02* (2006.01)
*B66B 7/04* (2006.01)

(52) U.S. Cl.
CPC ................ *B66B 7/022* (2013.01); *B66B 5/02* (2013.01); *B66B 7/046* (2013.01); *B66B 7/047* (2013.01)

(58) Field of Classification Search
CPC ........... B66B 5/02; B66B 7/022; B66B 7/046; B66B 7/047
See application file for complete search history.

(56) References Cited

U.S. PATENT DOCUMENTS 3,211,259 A * 10/1965 Tofanelli ................. B66B 7/022 187/408
5,284,226 A * 2/1994 Makimura ............ F16C 29/005 187/408
(Continued)

FOREIGN PATENT DOCUMENTS

CN 102020154 A 4/2011
CN 102471021 A 5/2012
(Continued)

*Primary Examiner* — Minh Truong
(74) *Attorney, Agent, or Firm* — William J. Clemens; Shumaker, Loop & Kendrick, LLP

(57) ABSTRACT

An elevator system, suitable both for normal operating situations and for emergency situations, includes an elevator car that can be displaced directly or indirectly within an elevator shaft, a guide means that is connected to the elevator car, a derailment protection device that is connected to the elevator car, and a guide rail that has a first subregion which works together with the guide means and is used to guide the elevator car along the guide rail, and that has a second subregion which works together with the derailment protection device. A clearance between the derailment protection device and the second subregion of the guide rail is large enough that the derailment protection device and the second subregion of the guide rail remain spaced apart from each other during the normal operating situations.

19 Claims, 6 Drawing Sheets

(56) References Cited

U.S. PATENT DOCUMENTS

| | | | | |
|---|---|---|---|---|
| 9,469,505 | B2 * | 10/2016 | Piech | B66B 7/022 |
| 10,017,356 | B2 * | 7/2018 | Hubbard | B23K 31/02 |
| 10,336,577 | B2 * | 7/2019 | Witczak | B66B 9/02 |
| 2007/0119331 | A1 * | 5/2007 | Korchagin | B66B 9/187 104/307 |
| 2011/0036670 | A1 | 2/2011 | Sanz Gamboa | |
| 2013/0270041 | A1 * | 10/2013 | Loeser | B66B 11/0407 187/250 |
| 2017/0057786 | A1 * | 3/2017 | Witczak | B66B 7/022 |
| 2019/0106292 | A1 * | 4/2019 | Zerelles | B66B 7/04 |
| 2022/0055865 | A1 * | 2/2022 | Roberts | B66B 11/043 |

FOREIGN PATENT DOCUMENTS

| | | | |
|---|---|---|---|
| CN | 102892700 | A | 1/2013 |
| CN | 203372954 | U | 1/2014 |
| CN | 107922152 | A | 4/2018 |
| CN | 108408536 | A | 8/2018 |
| JP | S5554277 | U | 4/1980 |
| JP | S55132072 | U | 9/1980 |
| JP | 2004218678 | A | 8/2004 |
| KR | 20150057062 | A | 5/2015 |
| WO | 2011010991 | A1 | 1/2011 |

* cited by examiner

ELEVATOR SYSTEM HAVING A DERAILMENT PROTECTION DEVICE

FIELD

The present invention relates to an elevator system having a derailment protection device.

BACKGROUND

In an elevator system, an elevator car is typically displaced vertically along a guide rail laid between different floors or levels within a building. At least in tall buildings, an elevator type is usually used in which the elevator car is held by rope-like or belt-like suspension elements and is displaced within an elevator shaft by moving the suspension element by means of a drive device. In order to at least partially compensate for the load of the elevator car to be moved by the drive device, a counterweight is usually fastened to an opposite end of the suspension element. This counterweight has at least the same mass as the elevator car. As a rule, the mass of the counterweight exceeds that of the elevator car by half of the payload that the elevator car can allow to be transported. Depending on the type of elevator, a plurality of counterweights and/or a plurality of elevator cars can also be provided in an elevator system.

Application CN108408536A discloses a symmetrical guide rail formed from sheet metal which is suitable for being completely enclosed by a guide means. For this purpose, the neck of the guide rail is designed to be flexible so that any deviations in the spacing between the two guide rails can be absorbed without damage. With such an arrangement, a guide means can transmit not only compressive forces but also tensile forces. The distribution of the loads on the guide rail is therefore more even. The disadvantage of this guide rail is that even during normal use, when there are actually hardly any forces acting between the guide rail and the guide means, considerable forces can occur due to the deviations in the spacing between the two guide rails. This can greatly reduce comfort of use.

SUMMARY

It could therefore be a goal to avoid the disadvantages of the prior art. Accordingly, there can be a need for an elevator system that achieves both an even distribution of the loads on the guide rail, and an optimal ride comfort.

An object of the invention is achieved by the subject matter of the advantageous embodiments defined in the following description.

According to one aspect of the invention, an elevator system which is suitable for both normal operating situations and for emergency situations is described. The elevator system has a drive device, an elevator car, a guide means, a derailment protection device, and a guide rail. The elevator car can be displaced directly or indirectly within an elevator shaft by the drive device. The guide means is connected to the elevator car. The derailment protection device is connected to the elevator car. The guide rail has a first subregion which works together with the guide means and which serves to guide the elevator car along the guide rail, and the guide rail has a second subregion which can work together with the derailment protection device. The clearance between the derailment protection device and the second subregion of the guide rail is large enough that the derailment protection device and the second subregion of the guide rail remain spaced from each other during normal operating situations.

The emergency situation is characterized by the guide means transmitting relatively high horizontal forces to the guide rails.

An emergency situation is, for example, a situation in which an immediate termination of elevator travel is necessary due to external or internal influences of the elevator system. If the elevator car is not evenly loaded, these loads cause large moments on the elevator car, which must be absorbed by the guide means. This creates high forces on the guide means. Typical emergency situations are, for example, the activation of a gripping device that brakes the elevator car on the guide rail, or an emergency stop in which the brake on the drive device brakes a moving elevator car.

Furthermore, events such as earthquakes or vandalism in the car, that is, jumping energetically or jumping against the walls, can lead to the guide means transferring very high forces to the guide rail, and are therefore to be regarded as an emergency situation.

A normal operating situation is to be understood as a situation in which the elevator car accelerates, travels, decelerates, or waits at a stop position for the purpose of transporting loads or people. The movement of the elevator car is typically caused by a drive. The purpose of transporting loads or people also includes empty travel—used to move the empty car to a floor in order to pick up loads or people there. When the elevator car is waiting at a stop position, this is for example because no call has been received or the elevator car is being loaded or unloaded.

The drive device of the elevator system typically indirectly causes the elevator car to move by using a traction means, for example a rope, a belt, a chain, or another means suitable for transmitting tensile forces, to transmit the movement of the drive device to the elevator car. The drive device can, however, also be attached directly to the elevator car or to a counterweight.

The elevator car is used to accommodate the loads to be transported. These can be people and/or goods. The guide means is fastened to the elevator car. The guide means is often also referred to as a guide shoe. Most guide means are designed as sliding guide shoes or roller guide shoes.

The guide rail is an elongated, substantially vertical installation in the elevator shaft, which is fastened to a shaft wall, for example. Guide rails are typically manufactured in accordance with the DIN ISO 7465 standard. But there are also known guide rails that are formed from sheet metal or cast from concrete.

The guide means works together with the guide rail. This cooperation ensures that the elevator car does not substantially deviate from a vertical orientation, does not substantially rotate about a vertical axis and does not substantially deviate from a horizontal target position.

The guide rail has a first subregion which works together with the guide means. This is, therefore, substantially those parts of the guide rail which are or can be contacted by a guide means, or which a guide means passes over with contact, during normal operation.

The guide rail has a second subregion. The second subregion is shaped in such a way that it does not interact with the guide means; in particular, the second subregion is not contacted by any guide means. It is designed in such a way that it forms a stop for the derailment protection device in an emergency situation.

The first subregion and the second subregion do not overlap. The first subregion can in particular be considered to be the region of the surface of the guide rail which a guide means passes over with contact during normal operation. And the second subregion can in particular be considered to be the region of the surface of the guide rail which a derailment protection device passes over with contact in all intended emergency situations. The first subregion and the second subregion, each viewed as subregions of the surface of the guide rail, therefore have no intersection.

The derailment protection device and the guide rail are designed in such a way that there is a clearance between the second subregion of the guide rail and the derailment protection device, which can also be referred to as the spacing. The clearance in this case is selected to be large enough to ensure that the derailment protection device and the second subregion of the guide rail do not touch each other, and/or remain spaced apart when the elevator is traveling. The clearance in this case is selected to be large enough that neither the tolerances during the installation of the guide rail, nor the vibrations of the elevator car during travel, nor the sum of these effects are sufficient to bring the derailment protection device into contact with the second subregion of the guide rail.

It is only the very high accelerations that occur during an emergency situation that create forces high enough to displace the guide means relative to the second subregion of the guide rail to a sufficient degree that the clearance is overcome, and the derailment protection device and the second subregion of the guide rail come into contact with each other. This prevents the guide means from being pushed any further relative to the guide rail. This ensures that the guide means remains securely guided on the guide rail. In particular, the guide means cannot derail.

The advantages of the invention are, inter alia, that derailment of the guide means can be prevented. Derailing is disadvantageous, on the one hand, because the elevator car is no longer guided in the elevator shaft and could therefore collide with installations in the shaft such as shaft doors or brackets, among other things. A derailment in an emergency situation with activation of the gripping device would be particularly disadvantageous. A derailment during an emergency situation or, in other words, during an arrest, would not only lead to the derailment of the guide means, but the gripping device could also derail, and the braking effect would thus fail. Preventing derailments is therefore very important.

Another advantage of the invention is that, thanks to the derailment protection device, the guide rail can be made more cost-effective than if the guide rail has to ensure that the guide means are guided safely by virtue of its strength alone. In a classic arrangement, the guide rail must be designed to be very stiff in order to ensure that the spacing between the two guide rails of an elevator system widens less than a permissible spacing. With the derailment protection device, this spacing between the two guide rails of an elevator system only increases until the derailment protection device prevents further widening.

In a preferred embodiment, the derailment protection device has a spacing from the second subregion of the guide rail of at least 1 mm during normal operating situations.

The spacing between the derailment protection device and the second subregion of the guide rail is defined as the minimum possible length—a straight connecting line—that connects a point of the derailment protection device and a point of the second subregion of the guide rail. Since this spacing is reduced by a shift in the derailment direction, this spacing extends substantially parallel to the derailment direction. The two surfaces, that of the derailment protection device and that of the second subregion of the guide rail, which, as protection against derailing, come into contact with each other, are preferably oriented substantially perpendicular to the direction of derailment. The spacing can therefore be measured in such a way that its extension is substantially parallel to the specific direction of movement which leads to derailment of the guide means. Alternatively, the spacing can also be measured in such a way that its extension is substantially perpendicular to the two surfaces—that of the derailment protection device and that of the second subregion of the guide rail. The minimum spacing of 1 mm ensures that the derailment protection device does not yet contact the second subregion even when larger deflections of the elevator car occur—for example, when it passes over larger surface irregularities. This has the advantage that no scratching noises or bumps can occur due to the contact between the derailment protection device and the second subregion of the guide rail during the operating situation. The derailment protection device advantageously has a spacing of at least 5 mm from the second subregion of the guide rail during normal operating situations.

In a preferred embodiment, the derailment protection device has a spacing of at least 1 mm from the entire guide rail during the normal operating situation.

The spacing can therefore not only be understood in the direction of the derailment movement, but also omnidirectionally. The spacing between the derailment protection device and the entire guide rail is defined as the minimum possible length—a straight connecting line—that connects a point of the derailment protection device and a point on the guide rail. This now also ensures that deflections in directions other than the derailment direction do not lead to contact between the derailment protection device and the guide rail.

The derailment protection device is advantageously spaced at least 5 mm from the guide rail during normal operating situations.

In a preferred embodiment, the clearance between the derailment protection device and the second subregion of the guide rail is eliminated in the emergency situation, and the second subregion and the derailment protection device work together.

The spacing between the derailment protection device and the second subregion of the guide rail is reduced by a shift in the derailment direction—as can occur in an emergency situation. As soon as the spacing approaches zero, i.e. is overcome, the derailment protection device and the second subregion of the guide rail touch each other. The movement in the derailment direction is stopped by the forces transmitted by this contact. This effectively prevents derailment.

In a preferred embodiment, at least two derailment protection devices are fastened to the elevator car per guide rail.

The elevator system typically has more than one guide rail. In particular, two guide rails are usually used. If forces act on the elevator car that substantially lead to a shift in the derailment direction, the elevator car is held on the guide rail by the use of a plurality of derailment protection devices on the same guide rail, such that the elevator car remains oriented parallel to the guide rail.

Furthermore, it is particularly advantageous if the derailment protection devices are fastened to the elevator car as far apart from each other as possible. If three or more derailment protection devices are installed, it is advantageous to distribute them evenly over the height of the elevator car.

In a preferred embodiment, a first derailment protection device is fastened to an upper end of the elevator car, and a second derailment protection device is fastened to a lower end of the elevator car.

A first derailment protection device is fastened to an upper end of the elevator car. The first derailment protection device is typically fastened to the elevator car in the vicinity of the upper guide means, that is to say, for example, less than 20 cm away from the guide means. The derailment protection device can be attached at the level of the car body, above the car body or overlapping the end of the car body. In particular, any attachment in an upper third, based on the car height, or further towards the top, can be viewed as an attachment at an upper end of the elevator car.

A further, second derailment protection device is fastened to a lower end of the elevator car. The second derailment protection device is typically fastened to the elevator car in the vicinity of the lower guide means—that is to say, for example, less than 20 cm away from the guide means. The derailment protection device can be attached at the level of the car body, below the car body or overlapping the end of the car body. In particular, any attachment in a lower third, based on the car height, or further towards the bottom, can be viewed as an attachment at a lower end of the elevator car.

The distribution of the derailment protection devices on an upper car end and a lower car end allows the spacing between the two derailment protection devices to be kept very large. As a result, the elevator car is initially optimally aligned parallel to the guide rail. Furthermore, a certain moment which acts on the elevator car due to the unevenly distributed load can be absorbed, as a result of the large spacing between the derailment protection devices, since relatively small forces act on the two derailment protection devices. In addition, the points at which the forces are received in the guide rail are relatively far apart; as a result, the guide rail is less stressed and less deformed than if these two forces introduced by the derailment protection devices are received closer together.

In a preferred embodiment, the second subregion of the guide rail also serves as a braking region for a gripping device.

An elevator system typically has a gripping device. Usually this gripping device is fastened to the elevator car and acts on a subregion of the guide rail. Usually this is the first subregion of the guide rail. The embodiment in which the second subregion of the guide rail also serves as a braking region for a gripping device allows the gripping device to act on the second subregion.

This has the advantage that the gripping device does not act on the first subregion of the guide rail. As a result, when activated, it cannot leave any disruptive grooves, marks or other irregularities on the first subregion of the guide rail. Such surface irregularity would have a negative effect on the ride comfort upon further operation of the elevator system. In addition, the first subregion of the guide rail can be designed as a hollow rail, since the first subregion of the guide rail does not have to absorb high contact forces, as would be caused by a gripping device.

In a further embodiment, the derailment protection device is formed as a component of the gripping device, in particular as a housing of the gripping device.

Like the derailment protection device, the gripping device should not touch the guide rail during normal operation. Contact with the guide rail is only permitted in an emergency situation. Since the housing of the gripping device according to the previous embodiments also engages around the second subregion of the guide rail, an advantageous choice of the geometry of the guide rail and gripping device can ensure that the gripping device, or the housing of the gripping device, also takes on the function of the derailment protection device.

Advantageously, one of the two derailment protection devices fastened to each guide rail is designed as a gripping device, while the other derailment protection device is not designed as a gripping device but as a separate component.

In a preferred embodiment, the derailment protection device has a sliding element or a rolling element which works together with the second subregion of the guide rail.

The derailment protection device, whether as a separate component or as a gripping device, has an element that allows low-friction movement between the second subregion of the guide rail and the derailment protection device. Such an element is advantageously designed as a sliding lining. However, a configuration in the form of rollers is also possible. The advantage is, on the one hand, that the guide rail and also the derailment protection device are protected from abrasion. On the other hand, however, the frictional force between the second subregion of the guide rail and the derailment protection device is also reduced. Too great a frictional force of this kind could result in undesired effects, such as, for example, an undesired increase in the moment of torque on the elevator car.

The sliding lining or the roller insert are advantageously designed to be exchangeable.

In a preferred embodiment, the derailment protection device has a first region which is used for fastening to the elevator car, and a second region which is designed to work together with the second subregion of the guide rail during the emergency situation.

In a preferred embodiment, the derailment protection device has a third region which connects the first region and the second region to each other in such a way that the first region and the second region are aligned substantially parallel to each other.

The derailment protection device has different regions that serve different functions. The first region is used for fastening to the car. The first region is advantageously designed to be flat and has one or more holes—advantageously, elongated holes—in order to be fastened to the elevator car. Essentially, a contact surface with the elevator car is provided, which is configured parallel to the car wall after the derailment protection device has been installed. The contact surface of the derailment protection device and the car wall surface lie against each other due to the contact.

The second region functions to work together with the second subregion of the guide rail. The second region is itself designed in such a way that it is suitable for contact with the second subregion of the elevator rail. The configuration of the second region could, for example, comprise a slightly curved shape or also a flat metallic surface. The second region can also have an adapter or some other fastening option for the roller or sliding elements. The second subregion is substantially oriented in such a way that it can optimally counteract derailment of the guide means because it is oriented perpendicular to the derailment direction.

The third region is used to connect the first and second regions to each other in such a way that the first and third regions are oriented parallel to each other. This ensures that the second subregion is aligned parallel to the car wall. This is advantageous because the derailment direction is usually perpendicular to the car wall.

In a preferred embodiment, the derailment protection device substantially comprises a portion of a metallic profile or a deformed metallic blank.

As a production method, it is possible to produce the basic shape, consisting of the first, second and possibly third part, as a rolled sheet metal profile or as an extruded aluminum profile. These profiles can then be cut into short pieces and completed by further work steps, such as drilling holes. An alternative manufacturing method is to bend a flat profile or to deep-draw sheet metal parts in an appropriate mold tool. The advantage of all of these methods is that they are extremely inexpensive.

In a preferred embodiment, the guide rail consists substantially of one or more metal sheets.

When a guide rail is used which consists of sheet metal, in particular when a guide rail is used that is substantially produced from sheet metal by roll profiling, the shaping of the first and second subregions of the guide rail is easy to implement.

In a preferred embodiment, the guide rail is shaped asymmetrically, and in particular the second subregion of the guide rail is shaped asymmetrically with respect to the guide rail.

It is sufficient to form the second subregion of the guide rail only on one side next to the first subregion of the guide rail. Since two subregions are arranged next to each other, the arrangement is asymmetrical. The arrangement can be shaped symmetrically; however, for this, one of the two subregions would have to be shaped twice so that it can be shaped on both sides of the other subregion. However, it is more advantageous to dispense with this symmetry and thus to be able to manufacture the rail more cost-effectively. This makes the guide rail asymmetrical. In particular, the guide rail has no plane of symmetry or reflection axis.

In a preferred embodiment, the second subregion of the guide rail is shaped as a fold in the sheet metal.

A fold is to be understood as meaning that there are two layers of sheet metal that are substantially touching. This has the advantage that the fold is also suitable for being used by a gripping device as a braking region, since the two metal sheets, which are substantially in contact, do not yield even under very high normal forces of the gripping device. A profile which would be designed to be hollow on the second subregion of the guide rail clamped by the gripping device could yield under the load.

The rolled profile of the guide rail can advantageously be welded together at the tip of the fold.

Further advantages, features and details of the invention will become apparent from the following description of embodiments and from the drawings, in which identical or functionally identical elements are denoted with identical reference signs. The drawings are merely schematic and not to scale.

DETAILED DESCRIPTION

Figure 1:
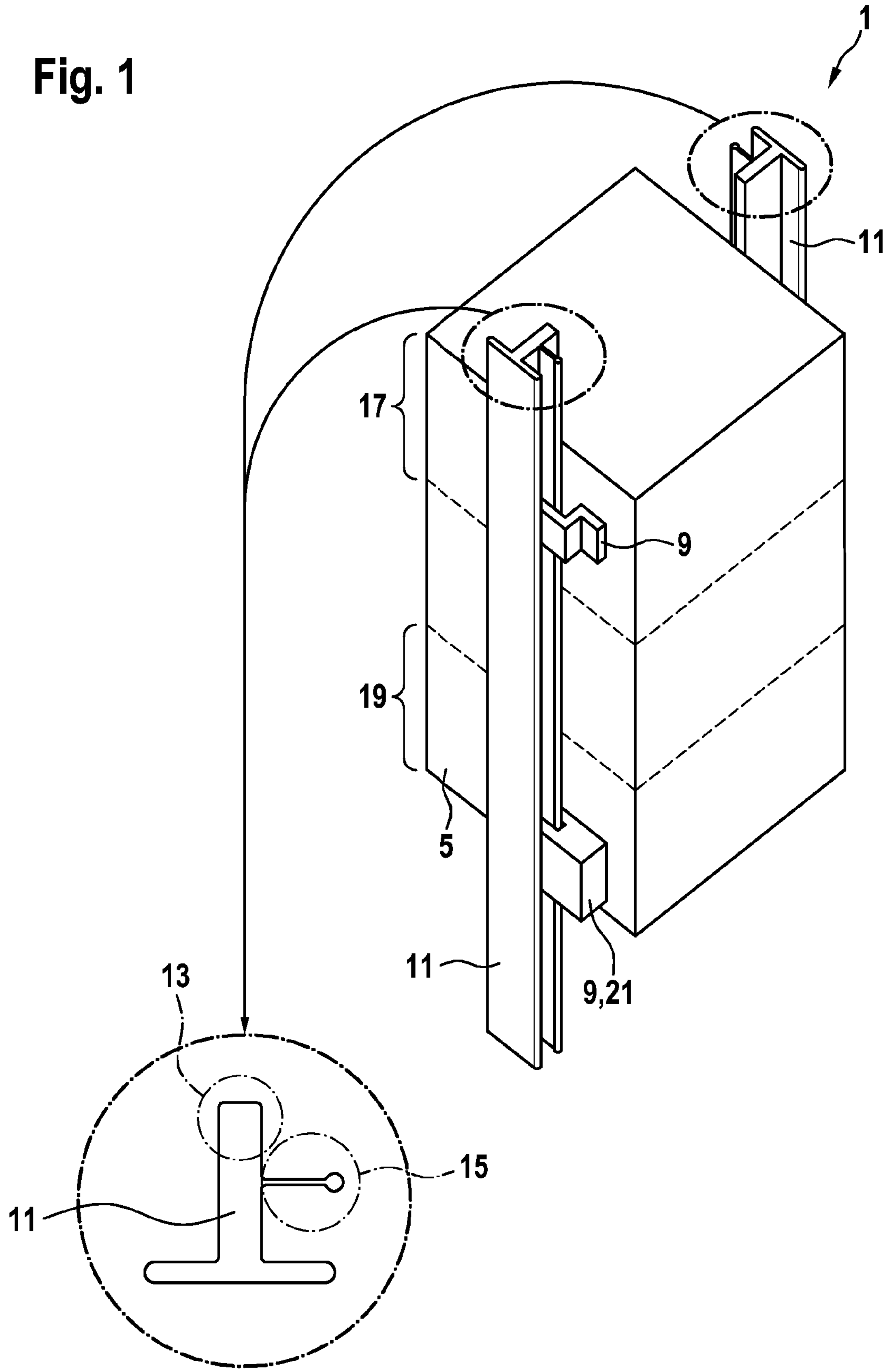
FIG. 1 is a schematic elevator system having a derailment protection device.

FIG. 1 shows schematically an elevator system 1 having an elevator car 5 which, in this embodiment, is guided between two guide rails 11. The guide means that serve to guide the elevator car 5 are not shown here. Two derailment protection devices 9 are attached so that they act on the guide rail at the left. Two derailment protection devices are also advantageously found on the other side of the elevator car 5. One of these two derailment protection devices 9 is fastened to an upper end 17 of the elevator car 5. This derailment protection device 9 substantially only serves its function—that is to say, to prevent the guide means from derailing from the guide rail 11. FIG. 1 does not show the guide means. A guide means suitable for the guide rail 11 of FIG. 1 is shown in FIGS. 2 to 4.

The other derailment protection device 9 shown is designed to also be the housing of a gripping device 21, and is fastened to a lower end 19 of the elevator car 5. If, in FIG. 1, a single person is riding in the elevator car 5 near the right guide rail, for example moving downwards, a moment will act on the elevator car 5 during this operating situation because the center of gravity of the complete elevator car including the load does not lie directly in an extension of the line of action of the suspension forces. This creates a moment in the elevator car. As a result, the elevator car initially tilts slightly to the side and is then supported by the guide means, and/or further tilting is prevented. The forces acting on the guide means thus compensate for the moment. In particular, in this situation the upper end 17 of the elevator car 5 would primarily be pressed in the direction of the right guide rail 11. Nevertheless, the upper derailment protection device 9 on the left-hand side will not yet touch the guide rail 11. Only when, for example, due to an emergency situation, the moment increases sharply, will the upper derailment protection device 9 prevent the derailment of the guide means at the upper derailment protection device. The same applies to the derailment protection device diagonally opposite at the bottom right of the elevator car (not shown).

Figure 2:
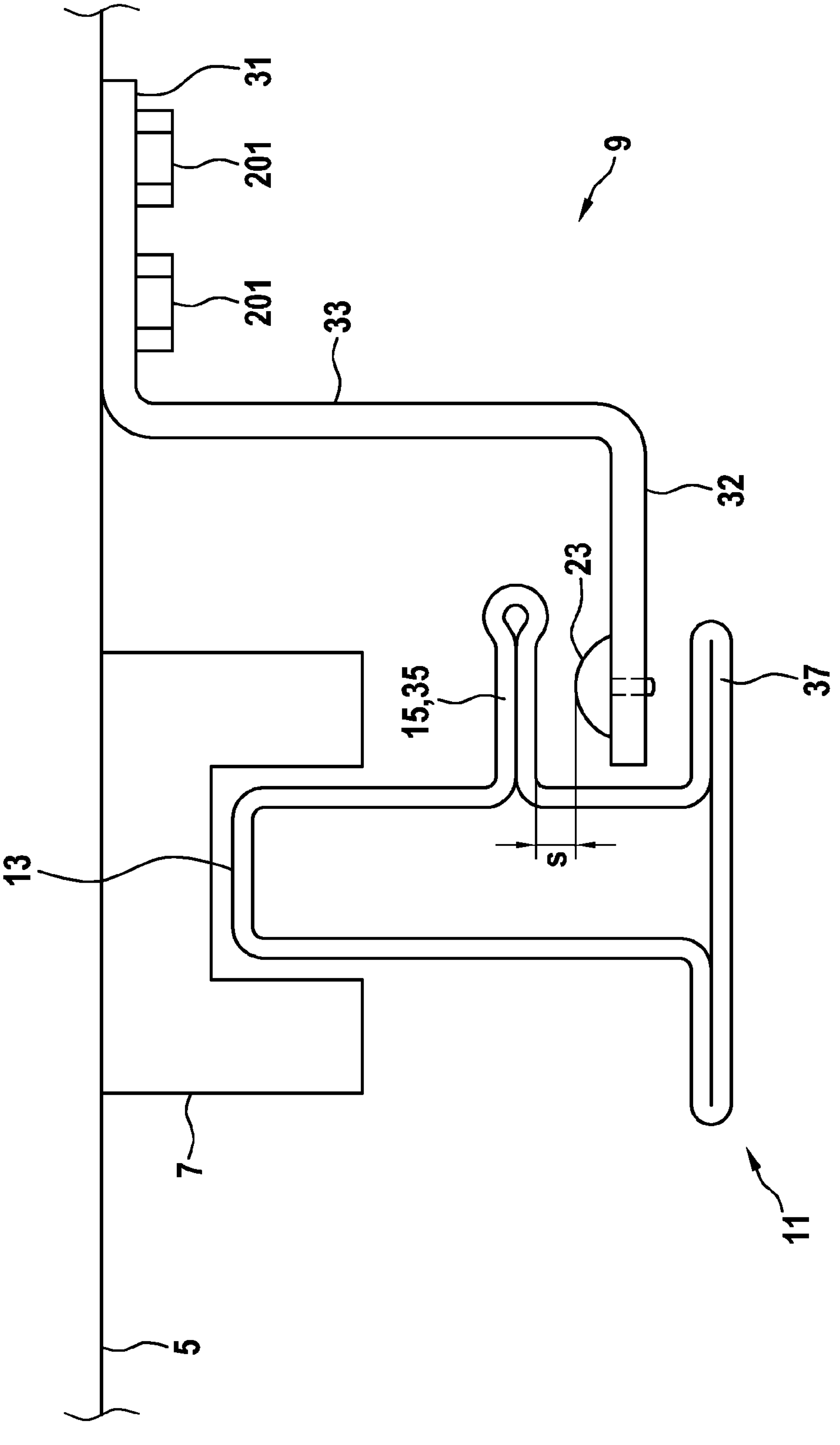
FIG. 2 is a derailment protection device with a sliding liner.
Figure 3:
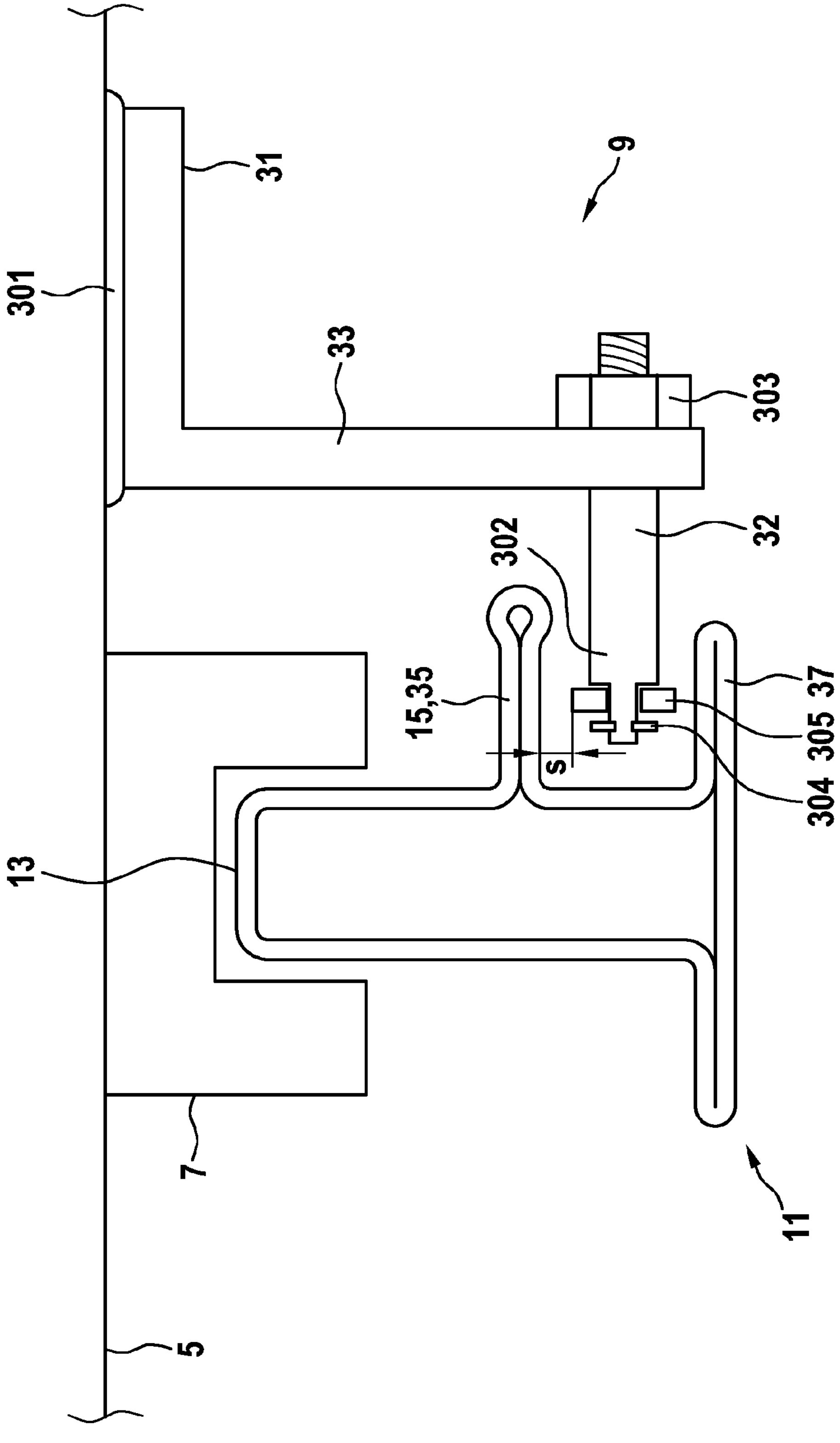
FIG. 3 is a derailment protection device with a roller.
Figure 4:
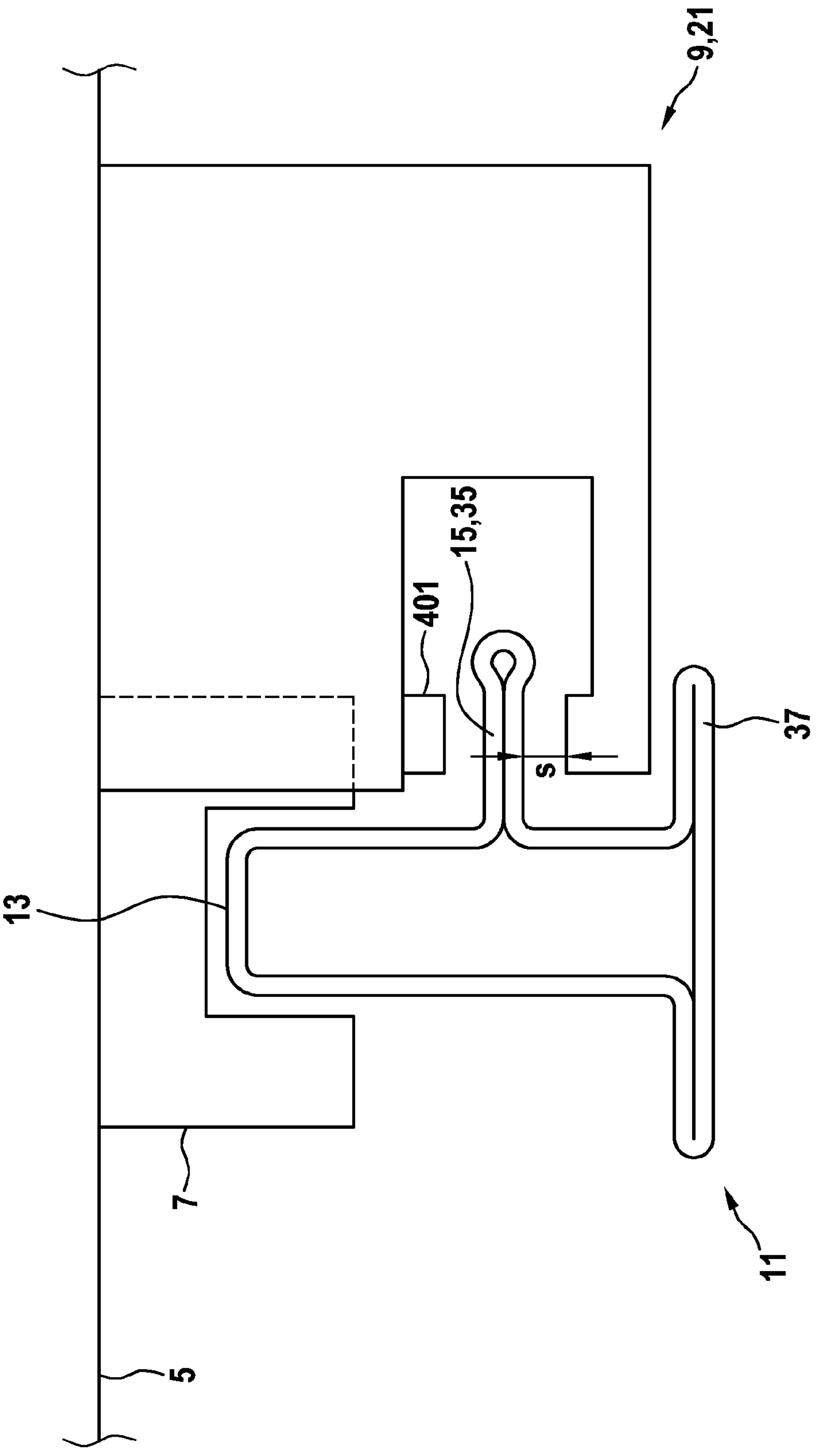
FIG. 4 is a gripping device that acts as a derailment protection device.

FIGS. 2 to 4 show, among other things, a possible embodiment of a guide rail 11. The guide rail 11 has a first subregion 13 which is used to guide the elevator car 5 via a guide means 7. Such a guidance is characterized in that the elevator car 5 is prevented from being displaced to the right, to the left, and downward, as shown in FIGS. 2 to 4. As is usual with guide rails 11, however, there is a push direction of the elevator car 5—upward, in the figure—which is not prevented by the cooperation of the guide rail 11, in particular the first subregion 13 of the guide rail 11, and the guide means 7.

In order to also prevent displacement in this direction, the guide rail 11 has a second subregion 15 on which a derailment protection device 9 can act. The guide rail 11 is formed from metal sheets 37. The second subregion 15 is shaped as a fold 35. This is to say that the two layers of the metal sheet 37 which form this fold 35 are substantially not spaced apart from each other. At its end, the fold 35 can have a small bending radius. Alternatively, it would also be possible to provide the weld seam there for closing the profile.

FIGS. 2 to 4 and 6 illustrate that the first subregion 13 and the second subregion 15 of the guide rail 11 do not touch or overlap. These are two separate regions. The guide rail 11 is designed asymmetrically. None of the guide rails 11 shown in these figures has a mirror plane or an axis of symmetry.

The clearance s in FIGS. 2 to 4 and 6 is selected to be large enough that the vibrations and deflections occurring during the normal operating situation do not yet lead to contact with the derailment protection device 9. Such contact would cause noise, which would be detrimental to passenger comfort. In addition, the clearance s allows possible positional errors of the guide rail 11 to be compensated without additional forces acting on the elevator car 5 as a result.

FIG. 2 shows a section through a guide rail 11, a guide means 7, and a derailment protection device 9. The derailment protection device 9 and the guide means 7 are fastened to the elevator car 5. The derailment protection device 9 has a sliding element 23. The derailment protection device has a first region 31 which is fastened to the elevator car via the screws 201. The first region 31 is oriented parallel to the wall of the elevator car 5. The second region 32 is also oriented parallel to the wall of the elevator car and thus also to the first region 31. These areas are connected via a third region 33.

FIG. 3 shows a section through a guide rail 11, a guide means 7, and a derailment protection device 9. The derailment protection device 9 and the guide means 7 are fastened to the elevator car 5. The derailment protection device 9 can be fastened by means of adhesive 301. The derailment protection device 9 has a roller element 305. The derailment protection device has a first region 31 which is fastened to the elevator car 5 by means of adhesive 301. The first region 31 is oriented parallel to the wall of the elevator car 5. The second region 32 comprises an axle 302 which allows the roller 305 to roll on the second subregion 15 in an emergency situation. The roller 305 is secured by a locking ring 304. The second subregion 32 is aligned parallel to the wall of the elevator car 5 and thus also to the first region 31. These regions are connected via a third region 33. The connection between the second region 32 and the third region 33 is ensured by the nut 303.

FIG. 4 shows a section through a guide rail 11, a guide means 7, and a derailment protection device 9. The derailment protection device 9 is designed as a gripping device 21. The gripping device 21 can clamp the fold 35 and thus the second subregion 15 of the guide rail 11 with the braking means 401. On the one hand, the elevator car 5 can be arrested as a result of the frictional forces generated in this way, but on the other hand, the engagement around the second subregion 15 of the guide rail 11 provides reliable protection against derailing. The derailment protection device 9—that is to say, the gripping device 21—and the guide means 7 are fastened to the elevator car 5. The derailment protection device 9 is optimally fastened via a form fit, which is secured, for example, by screws. The contact that arises in the emergency situation between the second subregion 15 of the guide rail 11 and the gripping device 21 can either be generated directly on the gripping device 21 by a brake lining, or a sliding element or a rolling element is provided on the housing especially for this purpose. It is also possible that the contact elements provided for the second subregion 15 of the guide rail 11, i.e. a sliding or rolling element and/or the brake lining of a gripping device, individually or jointly perform the task of protecting against derailment. In particular, only one of the contact elements provided can initially act, such that further contact elements work together with the second subregion 15 of the guide rail 11 as the force increases.

The fastening methods for fastening the derailment protection device 9 to the elevator car 5, such as screws 201, adhesive 301 or by means of a form fit, are not tied to a specific embodiment and can be used in all of the embodiments in FIGS. 2 to 4 and 6. Furthermore, the ways in which the contact to the second subregion 15 of the guide rail 11, such as the sliding elements 23, the roller elements 305 or the brake lining 401, is designed, are not tied to a specific embodiment and can be used in all the embodiments of FIGS. 2 to 4 and 6.

In the operating situation, there is a minimum spacing s between the derailment protection device 9 and the second subregion 15 of the guide rail. This spacing s ensures that the displacements that occur during normal travel of the elevator 5, that is, in the operating situation, do not yet lead to contact between the derailment protection device 9 and the second subregion 15 of the guide rail 11. Only in an emergency situation that leads to increased vertical acceleration and thus also increases the moments in the elevator car does the derailment protection device 9 interact with the second subregion 15 of the guide rail 11.

Figure 5:
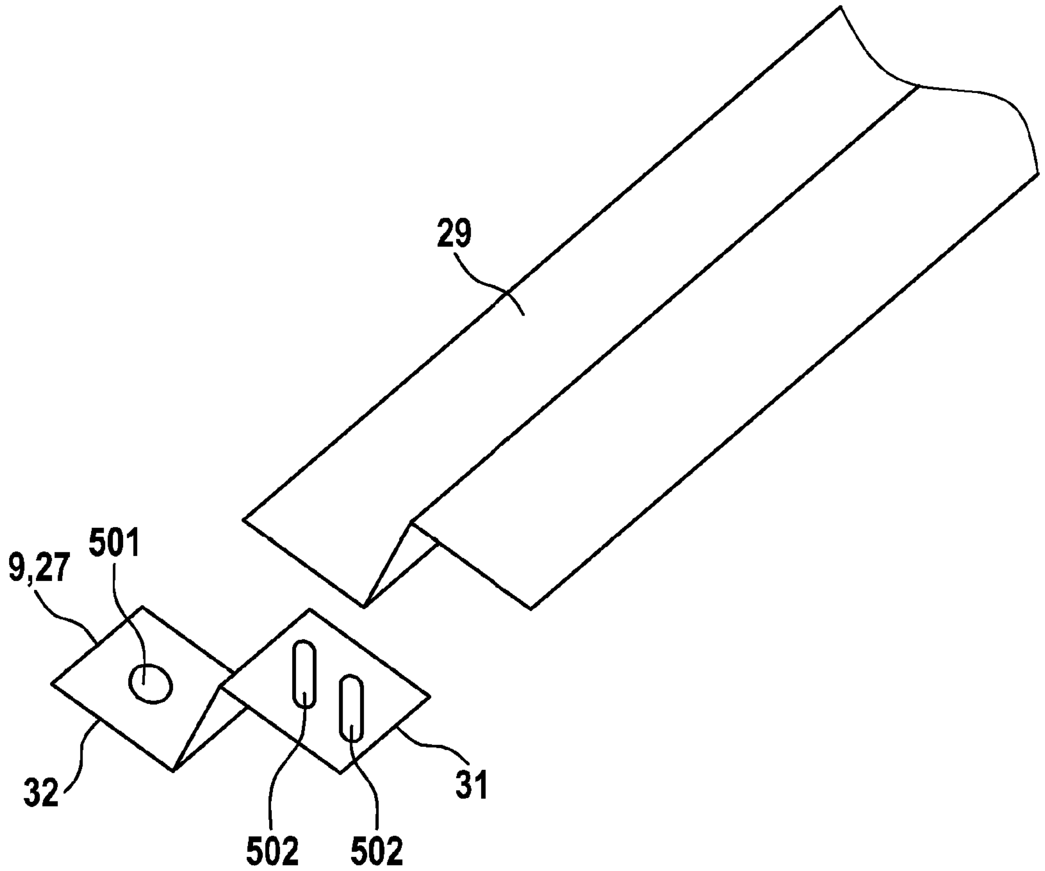
FIG. 5 is a rolled profile and a portion that serves as derailment protection device.

FIG. 5 shows a metallic profile 29 and a section 27 separated therefrom, which after further processing steps can be assembled together with further components to form a derailment protection device 9, as shown in particular in FIG. 2. The metallic profile 29 can be an extruded profile. Extruded profiles are often made of aluminum. Alternatively, such a metallic profile 29 can be produced from sheet metal by roll forming.

The section 27 separated from the metallic profile 29 is reworked in order to obtain a derailment protection device, as shown in FIG. 2. A bore 501 in a second region 32 allows the section 27 to receive a sliding element 23. In a first region 31, elongated holes 502 can be punched, which are used for fastening to the elevator car 5. It is of course also possible to carry out these work steps before the section 27 is cut off. This can take place, in particular in the case of production by roll forming, before the roll forming, or also during the roll forming.

Figure 6:
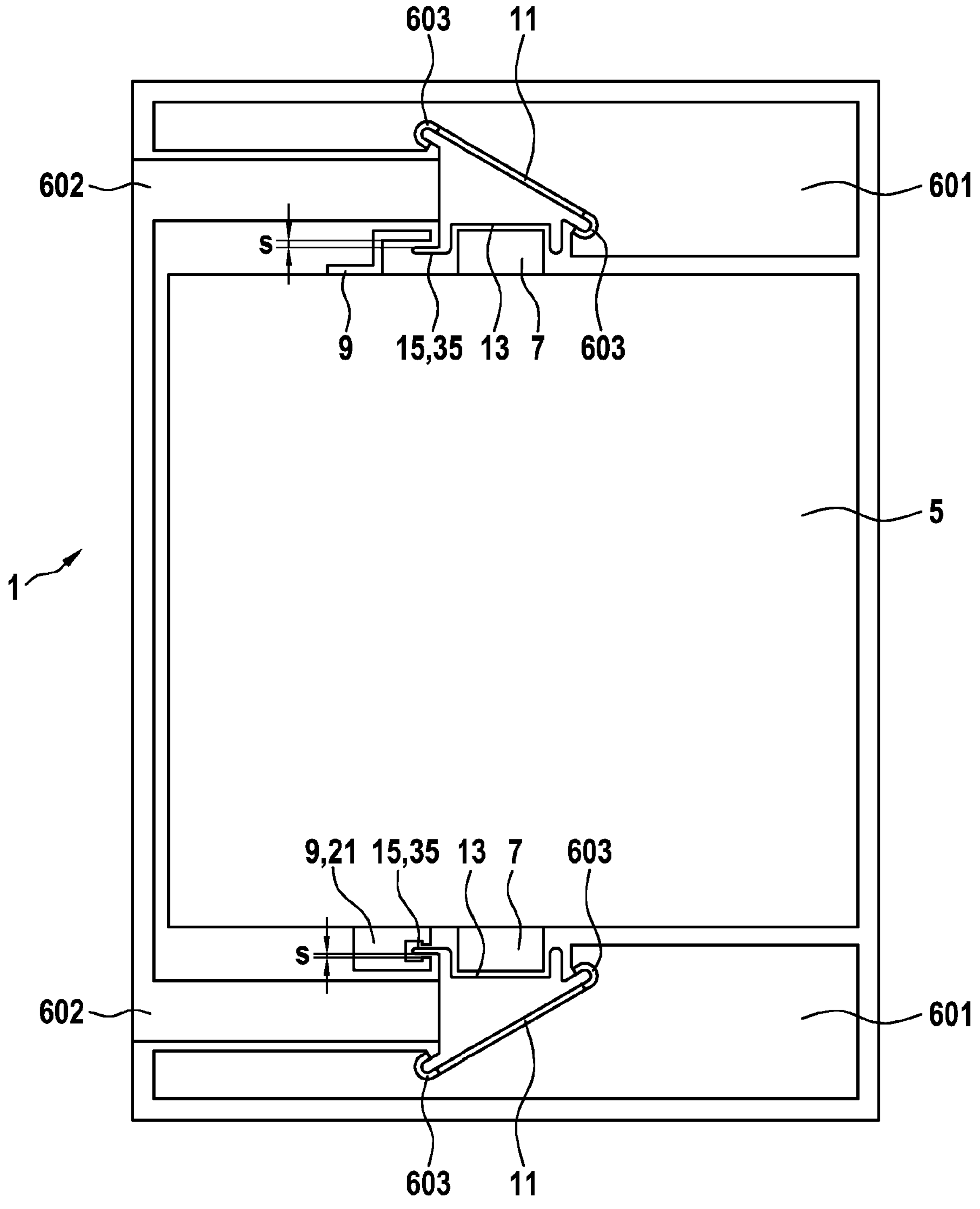
FIG. 6 is an alternative embodiment of an elevator system having a derailment protection device.

FIG. 6 shows an alternative embodiment of the elevator system 1, having a derailment protection device 9. The embodiment comprises an elevator car 5 which is guided on two guide rails 11, each with a guide means 7. The guide rail 11 has a first subregion 13 which works together with the guide means 7 fastened to the elevator car. A second subregion 15 of the guide rail 11 is configured separately therefrom, and this can interact with the derailment protection device 9. This second subregion 15 is designed as a fold 35 in the profile—produced, for example, by roll profiling. This elevator rail 11 also has two guides 603 which serve to guide the counterweights 601. The two guides 603 thus correspond to a third subregion of the guide rail 11. The brackets 602 allow the elevator rail to be fastened to the shaft wall. The elevator system of FIG. 6 allows optimized utilization of the cross-sectional area of the elevator shaft.

FIG. 6 shows, in the top part, a different embodiment of the derailment protection device 9 than in the lower part. In the top part of the figure, the situation is shown as it is typically provided at an upper end of the elevator car 5. A derailment protection device 9 is fastened to the elevator car 5. In the lower part of the figure, the situation is shown as it is typically provided at a lower end of the elevator car 5. The derailment protection device 9, advantageously integrated into a gripping device 21, is fastened to the elevator car 5. See also FIG. 1, which shows a typical arrangement of the different design variants of the derailment protection device.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system that is suitable both for normal operating situations and for emergency situations, the elevator system comprising:
 - an elevator car adapted to move within an elevator shaft;
 - a guide means connected to the elevator car;
 - a derailment protection device connected to the elevator car, where the guide means and the derailment protection device are mounted directly to different portions of an elevator car wall; and
 - a guide rail having a first subregion that is contacted by the guide means to guide the elevator car along the guide rail via a channel-shaped sliding interface which delimits motion of the guide means with respect to the guide rail in three horizontal directions and permits said motion in a fourth horizontal direction, the guide rail having a second subregion that contacts the derailment protection device during the emergency situations, the second subregion being oriented perpendicular to the fourth horizontal direction,
 - wherein a clearance between the derailment protection device and the second subregion of the guide rail maintains the derailment protection device and the second subregion of the guide rail spaced apart during the normal operating situations, and the clearance is less than a disengagement distance of the channel-shaped sliding interface in the fourth horizontal direction during the normal operating situations, the disengagement distance is a distance between the guide means and the first subregion where the channel-shaped sliding interface no longer delimits motion of the guide means in the three horizontal directions; wherein the second subregion of the guide rail also provides a braking region for a gripping device connected to the elevator car.

2. The elevator system according to claim 1 wherein the derailment protection device is spaced at least 1 mm away from the second subregion of the guide rail during the normal operating situations.

3. The elevator system according to claim 1 wherein the derailment protection device is spaced at least 1 mm from the guide rail during the normal operating situations.

4. The elevator system according to claim 1 wherein, during the emergency situations, the clearance between the derailment protection device and the second subregion of the guide rail is eliminated and the second subregion and the derailment protection device cooperate to prevent derailment of the elevator car.

5. The elevator system according to claim 1 wherein at least two of the derailment protection devices are connected to the elevator car for each of the guide rail guiding the elevator car.

6. The elevator system according to claim 5 wherein the derailment protection device is a first derailment protection device connected to an upper end of the elevator car, and including a second derailment protection device connected to a lower end of the elevator car.

7. The elevator system according to claim 1 wherein the derailment protection device is formed as a component of the gripping device.

8. The elevator system according to claim 1 wherein the derailment protection device is formed as a housing of the gripping device.

9. The elevator system according to claim 1 wherein the derailment protection device has a sliding element or rolling element that cooperates with the second subregion of the guide rail.

10. The elevator system according to claim 1 wherein the derailment protection device has a first region adapted for fastening to the elevator car and a second region that cooperates with the second subregion of the guide rail during the emergency situations.

11. The elevator system according to claim 10 wherein the derailment protection device has a third region that connects the first region and the second region to each other whereby the first region and the second region are oriented parallel to each other.

12. The elevator system according to claim 10 wherein the derailment protection device is formed from a section of a metallic profile or a deformed metallic blank.

13. The elevator system according to claim 1 wherein the guide rail is formed from at least one metal sheet.

14. The elevator system according to claim 13 wherein the guide rail is shaped asymmetrically.

15. The elevator system according to claim 13 wherein the second subregion of the guide rail is shaped asymmetrically.

16. The elevator system according to claim 15 wherein the second subregion of the guide rail is shaped as a fold of the at least one metal sheet.

17. An elevator system that is suitable both for normal operating situations and for emergency situations, the elevator system comprising:
 - an elevator car adapted to move within an elevator shaft;
 - a guide means connected directly to a side of the elevator car;
 - a derailment protection device connected directly to the side of the elevator car at a location distal from the guide means; and
 - a guide rail having a first subregion that is contacted by the guide means to guide the elevator car along the guide rail via a channel-shaped sliding interface which delimits motion of the guide means with respect to the guide rail in three horizontal directions and permits said motion in a fourth horizontal direction, the guide rail having a second subregion that contacts the derailment protection device during the emergency situations when the guide means moves away from the first subregion in the fourth horizontal direction perpendicular to the second subregion,
 - wherein a clearance between the derailment protection device and the second subregion of the guide rail maintains the derailment protection device and the second subregion of the guide rail spaced apart during the normal operating situations, and the clearance is less than a disengagement distance of the channel-shaped sliding interface in the fourth horizontal direction during the normal operating situations, the disengagement distance is a distance between the guide means and the first subregion where the channel-shaped sliding interface no longer delimits motion of the guide means in the three horizontal directions; wherein the second subregion of the guide rail also provides a braking region for a gripping device connected to the elevator car.

18. The elevator system according to claim 17 wherein the derailment protection device is spaced from the guide means.

19. An elevator system comprising:
 - an elevator car adapted to move within an elevator shaft;
 - a guide means connected to a side of the elevator car;

a derailment protection device connected to the side of the elevator car at a location distal from the guide means; and a guide rail having a channel-shaped first subregion in which the guide means slides to guide the elevator car along the guide rail, where the guide rail delimits motion of the guide means in three horizontal directions and permits motion of the guide means in a fourth horizontal direction, and where the guide rail has a second subregion that contacts the derailment protection device during emergency situations when the guide means moves away from the first subregion in the fourth horizontal direction, and the guide rail has a third subregion which slidably guides an elevator counterweight along the guide rail, wherein a clearance between the derailment protection device and the second subregion of the guide rail maintains the derailment protection device and the second subregion of the guide rail spaced apart during normal operating situations, and the clearance is less than a disengagement distance of the guide means in the channel-shaped first subregion in the fourth horizontal direction during the normal operating situations, the disengagement distance is a distance between the guide means and the first subregion where the channel-shaped sliding interface no longer delimits motion of the guide means in the three horizontal directions; wherein the second subregion of the guide rail also provides a braking region for a gripping device connected to the elevator car.

* * * * *